(12) United States Patent
Ikai et al.

(10) Patent No.: US 9,772,622 B2
(45) Date of Patent: Sep. 26, 2017

(54) MOTOR CONTROL SYSTEM PROVIDED WITH FUNCTION TO DETECT ABNORMAL BRAKING

(71) Applicant: FANUC CORPORATION, Yamanashi (JP)

(72) Inventors: Satoshi Ikai, Yamanashi (JP); Tomoyuki Aizawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/227,175

(22) Filed: Aug. 3, 2016

(65) Prior Publication Data
US 2017/0038768 A1   Feb. 9, 2017

(30) Foreign Application Priority Data

Aug. 7, 2015   (JP) .................................. 2015-156885

(51) Int. Cl.
  *H02K 17/32*    (2006.01)
  *G05B 19/416*    (2006.01)
  *F16D 66/00*    (2006.01)

(52) U.S. Cl.
  CPC ........... *G05B 19/416* (2013.01); *F16D 66/00* (2013.01); *G05B 2219/34013* (2013.01)

(58) Field of Classification Search
  CPC .......... B23Q 3/00; B23Q 3/152; B23Q 3/157; H02P 3/26; H02P 3/14; H02P 3/16; H02P 3/18; E21B 3/00; B60W 10/18; B65H 59/16; G06F 19/00; B60L 7/10
  USPC .... 363/40, 95, 109, 120, 174, 175; 318/560, 318/362, 371, 372, 375, 376, 400.01, 318/400.14, 400.15, 700, 701, 727, 779, 318/799, 800, 801; 477/143, 147, 182, 4, 477/9, 40, 71, 92; 180/244, 276, 370; 188/4 B, 24.14, 24.18, 73.33, 79.55, 84, 188/140 A, 206 R, 157, 159; 483/30; 173/45, 176, 213
  See application file for complete search history.

(56) References Cited

U.S. PATENT DOCUMENTS 5,142,210 A * 8/1992 Kojima .............. G05B 19/4062
                                              318/275

FOREIGN PATENT DOCUMENTS

| JP | 6284766 A | 10/1994 |
| JP | 3081258 B2 | 8/2000 |
| JP | 2013032825 A | 2/2013 |

OTHER PUBLICATIONS

English Abstract and Machine Translation for Japanese Publication No. 2013-032825 A, published Feb. 14, 2013, 13 pgs.

(Continued)

*Primary Examiner* — Antony M Paul
(74) *Attorney, Agent, or Firm* — Fredrikson & Byron, P.A.

(57) ABSTRACT

A motor control system of the present invention includes a servo electricity supply unit supplying electricity to a servo motor, and a controller controlling the servo motor, a mechanical brake and the servo electricity supply unit. The controller controls the servo electricity supply unit to stop the supply of electricity to the servo motor when a signal receiving unit receives a signal for actuating the mechanical brake and to resume the supply of electricity to the servo motor when an abnormality determining unit determines that abnormality exists in the mechanical brake.

4 Claims, 5 Drawing Sheets

(56) References Cited

OTHER PUBLICATIONS

English Abstract and Machine Translation for Japanese Publication No. 06-284766 A, published Oct. 7, 1994, 11 pgs.
English Abstract and Machine Translation for Japanese Publication No. 3081258 B2, published Aug. 28, 2000, 9 pgs.

* cited by examiner

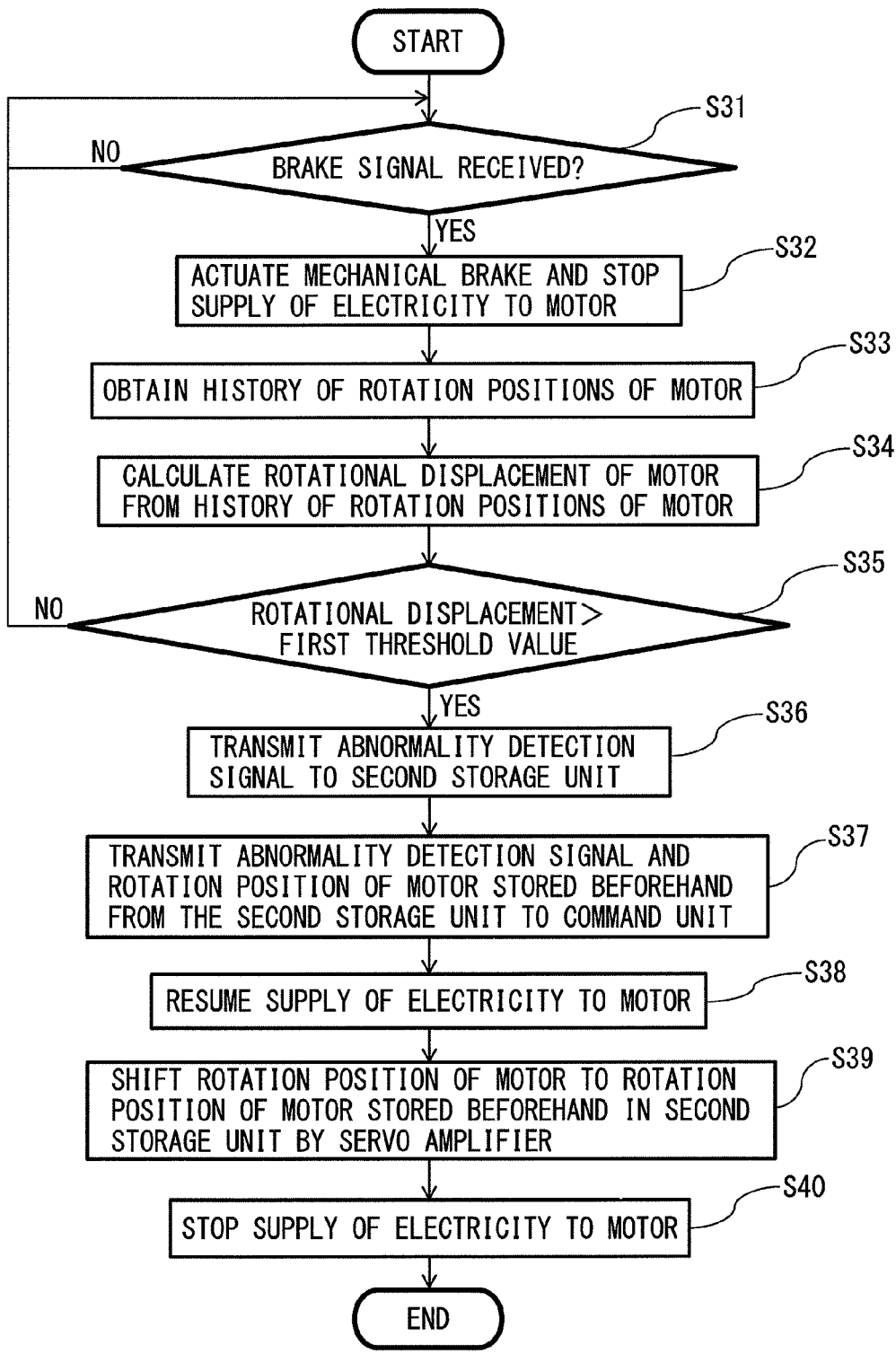

MOTOR CONTROL SYSTEM PROVIDED WITH FUNCTION TO DETECT ABNORMAL BRAKING

BACKGROUND OF THE INVENTION

1. Field of Invention

The present invention relates to a motor control system provided with a mechanical brake which stops an output axis of a servo motor once the excitation of the servo motor is released, and especially relates to a motor control system provided with a function of detecting abnormalities in such a mechanical brake.

2. Description of the Related Art

A machine tool which moves a main spindle head along a ball screw by rotating the ball screw by a servo motor is conventionally known. A tool such as an end mill or drill is attached to the main spindle head, and a workpiece is machined by moving the main spindle head towards the workpiece while rotating the tool.

Further, there is a machine tool, such as a vertical milling machine, wherein a ball screw extends in the direction of gravity, so that the main spindle head is moved up and down in the direction of gravity. In such a machine tool, if the excitation of the servo motor is released when the power is off or during an emergency stoppage, the ball screw can rotate freely and there is a risk that the main spindle head may fall due to gravity. Therefore, in a machine tool where the main spindle head moves up and down, a mechanical brake for stopping the output axis of the servo motor when the power is off or during an emergency stoppage, is attached.

Further, in an industrial robot, a servo motor is used to drive an axis of the robot, and therefore, there is also a risk that the arm of the robot will fall when the excitation of the servo motor is released when the power is off or during an emergency stoppage. Therefore, in industrial robots a mechanical brake for stopping the output axis of the servo motor is mounted.

Further if abnormality exists in the aforementioned mechanical brake, when the power is off or during an emergency stoppage, the main spindle head of the machine tool or the robot arm may fall. Accordingly, as illustrated in Japanese Patent No. 3081258 or Japanese Patent Application Laid-open No. H06-284766 or the like, a method for detecting abnormalities in the aforementioned mechanical brake has been proposed.

Japanese Patent No. 3081258 discloses a mechanical brake including a brake disc connected to an output axis of a motor, and a brake shoe pressed against the brake disc. Further, in a method of detecting a failure of the mechanical brake disclosed in Japanese Patent No. 3081258, when braking a rotary axis of the motor, the current value at the start of the motor rotating is detected while the current supplied to the motor is gradually increased. Similarly, when the rotary axis of the motor is not braked, the current value at the start of the motor rotating is detected while the current supplied to the motor is gradually increased. Further, by comparing the difference between the detected current values and a set value corresponding to the brake torque, a failure of the mechanical brake is detected.

Moreover, in the method of detecting abnormality in a mechanical brake disclosed in Japanese Patent Application Laid-open No. H06-284766, when the amount of wear of a friction braking member of a mechanical brake is within a normal range, the motor is driven without actuating the mechanical brake and the motor load current value at the time the motor is driven is measured and stored beforehand. In the case inspecting the mechanical brake, as when the amount of wear of the friction braking member is within a normal range, the motor is driven without actuating the mechanical brake, and the size of the motor load current while the motor is driven is detected. Further, abnormality of the mechanical brake is detected by comparing the detected motor load current value with the previously stored motor load current value.

Further, any abnormality detected in the aforementioned mechanical brake is indicative of a significant reduction in the force for stopping the output axis of the servo motor. Thus, there is a risk that the main spindle head of the machine tool or the robot arm may fall unless the inspection or repair of the mechanical brake is completed. To address this, it is desired that the shortage of the braking force for the output axis of the servo motor be compensated by some kind of method immediately after the detection of the abnormality of the mechanical brake. To exemplify such a method, Japanese Patent Application Laid-open No. 2013-032825 discloses a power transmission controller of a vehicle, wherein, in the case of abnormality in a brake, a new braking force is generated in addition to a friction braking force to ensure a sufficient braking force.

The mechanical brake abnormality detection methods disclosed in the aforementioned Japanese Patent No. 3081258 and Japanese Patent Application Laid-open No. H06-284766 are methods in which the diagnosis of the existence of abnormality of the mechanical brake is carried out by separately executing a mechanical brake inspection program. Accordingly, in the abnormality detection method for a mechanical brake disclosed in Japanese Patent No. 3081258 and Japanese Patent Application Laid-open No. H06-284766, there is the problem that there are cases when abnormality has occurred in the mechanical brake before the inspection of the mechanical brake is carried out. Therefore, it is desirable to have a method of detecting abnormality of a mechanical brake or indications thereof even when an inspection of the mechanical brake is not carried out.

Moreover, there is the problem that the power transmission controller of a vehicle disclosed in Japanese Patent Application Laid-open No. 2013-032825, in which a plurality of clutches are used in a mechanism compensating for the shortage of a friction braking force, has a structure too complicated for application to the output axis of the servo motor.

SUMMARY OF INVENTION

The present invention provides a motor control system which can detect, at an early stage, abnormality of a mechanical brake equipped for a servo motor and which can compensate for the shortage of a braking force immediately after the detection of the abnormality.

According to a first aspect of the present invention, there is provided a motor control system comprising: a servo motor; a mechanical brake which is configured to act on the servo motor or an axis driven by the servo motor; a servo electricity supply unit which supplies electricity to the servo motor; a controller which controls the servo motor, the mechanical brake, and the servo electricity supply unit; and a position detector which detects a rotation position of the servo motor or a position of the axis, wherein the controller comprises:

a signal receiving unit which receives a signal for actuating the mechanical brake;

a position monitoring unit which monitors the rotation position of the servo motor by the position detector, and obtains a history of the rotation positions of the servo motor from when the signal is received by the signal receiving unit to when the servo motor stops rotating;

a displacement amount calculation unit which calculates, from the history, a rotational displacement amount of the servo motor from when the signal is received by the signal receiving unit to when the servo motor stops rotating; and an abnormality determining unit which determines that abnormality exists in the mechanical brake when the calculated rotational displacement amount exceeds a predetermined first threshold value, and when the signal receiving unit receives the signal, the controller controls the servo electricity supply unit to stop the supply of electricity to the servo motor, and when the abnormality determining unit determines that abnormality exists in the mechanical brake, the controller controls the servo electricity supply unit to resume the supply of electricity to the servo motor.

According to a second aspect of the present invention, there is provided the motor control system of the first aspect, wherein the controller further includes a storage unit which, when the signal receiving unit receives the signal, stores and holds a rotation position of the servo motor when the signal is received, and when the abnormality determining unit determines that abnormality exists in the mechanical brake after the signal receiving unit receives the signal, the controller controls the servo electricity supply unit to resume the supply of electricity to the servo motor and shift the rotation position of the servo motor to the rotation position of the servo motor stored and held in the storage unit.

According to a third aspect of the present invention, there is provided the motor control system of the first aspect, wherein the controller further includes a storage unit which stores beforehand a predetermined position relating to the rotation position of the servo motor, and when the abnormality determining unit determines that abnormality exists in the mechanical brake after the signal receiving unit receives the signal, the controller controls the servo electricity supply unit to resume the supply of electricity to the servo motor and shift the rotation position of the servo motor to the predetermined position stored beforehand in the storage unit.

According to a fourth aspect of the present invention, there is provided the motor control system of the third aspect, wherein after the rotation position of the servo motor is shifted to the predetermined position stored beforehand in the storage unit, the controller controls the servo electricity supply unit to stop the supply of electricity to the servo motor.

BRIEF DESCRIPTION OF THE DRAWINGS

The above mentioned objects, features, and advantages and other objects, features and advantages of the present invention will become more apparent from the following detailed description of the exemplary embodiments of the present invention illustrated in the accompanying drawings in which:

FIG. 5 is a flowchart illustrating the operation of the motor control system of a third embodiment when detecting abnormality of the mechanical brake.

DETAILED DESCRIPTION

Figure 1:
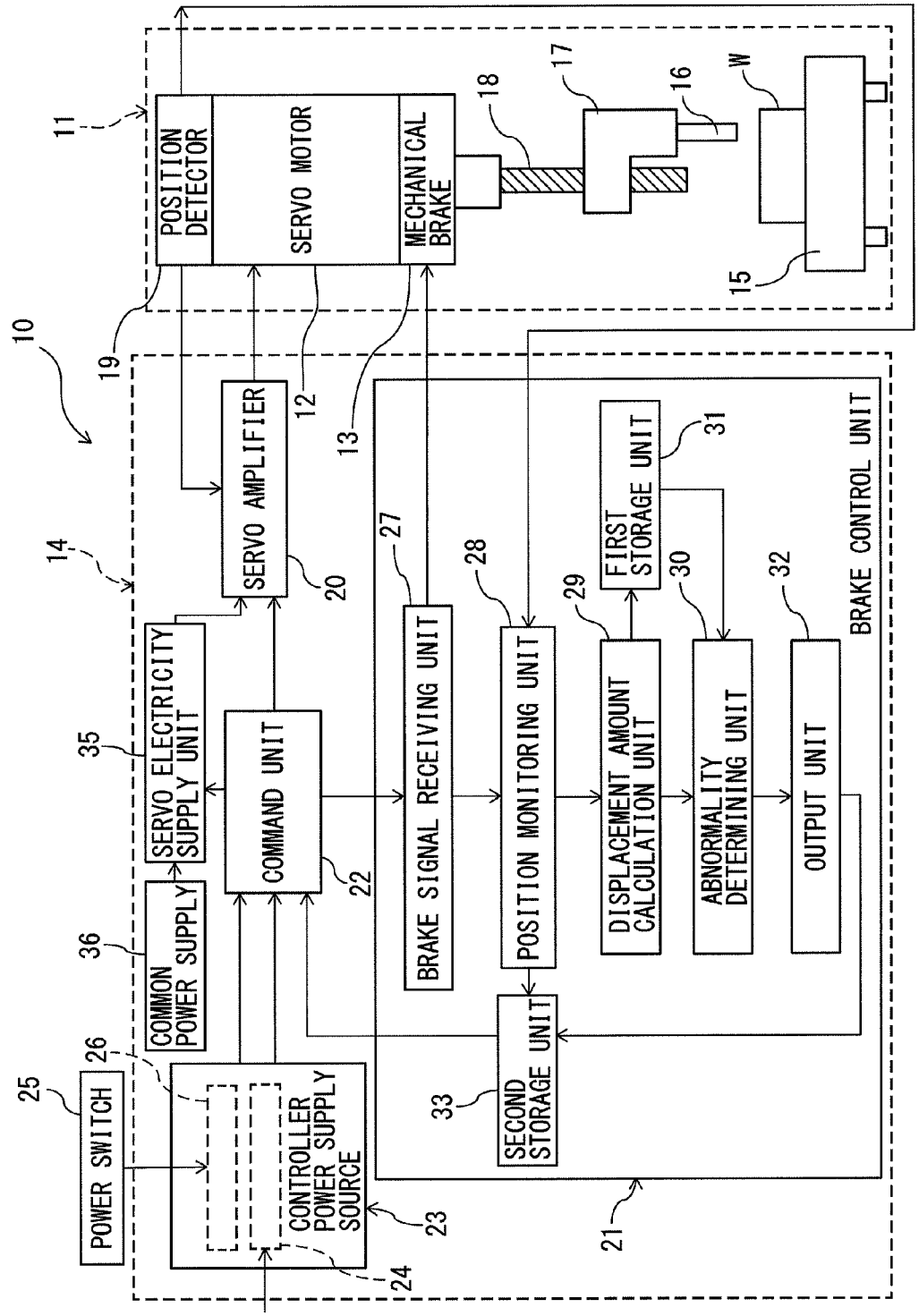
FIG. 1 is a block diagram illustrating the configuration of the motor control system of a first embodiment.

Hereinafter, embodiments of the present invention will be described referring to the drawings. The same reference numerals for the same constitutional elements are used in the drawings. The scale of the drawings has appropriately been adjusted so as to facilitate the understanding of the present invention. Further, the following explanation of the motor control system is exemplified by the application thereof to a machine tool. However, the present invention is not limited thereto.

First Embodiment

FIG. 1 is a block diagram illustrating the configuration of the motor control system of the first embodiment.

The motor control system of the first embodiment, as illustrated in FIG. 1, comprises a servo motor 12 built into a machine tool 11, a mechanical brake 13 which acts on the servo motor 12 or an axis driven by the servo motor 12, and a controller 14 which controls the servo motor 12 and the mechanical brake 13.

The machine tool 11 is, for example, a vertical machining center or a vertical milling machine or the like. The machine tool 11 includes a work table 15 on which a workpiece W to be machined is mounted and a main spindle head 17 which is provided above the work table 15 and to which a tool 16 for machining the workpiece W mounted on the work table 15 is attached. The main spindle head 17 is movable along a ball screw 18 extending in the direction of gravity. The ball screw 18 is connected to the output axis of the servo motor 12.

The machine tool 11 comprises a position detector 19, for example an encoder, which detects the position (rotation position) of the output axis of the servo motor 12. The controller 14 comprises a servo amplifier 20 which is connected to and controls the servo motor 12 of the machine tool 11 and a brake control unit 21 which is connected to and controls the mechanical brake 13.

A command unit 22 is connected to the servo amplifier 20 and the brake control unit 21. The command unit 22 provides command values such as the rotational speed or the rotation position of the servo motor 12 to the servo amplifier 20. Further, the servo amplifier 20 feedback controls the servo motor 12 based on the command value of the command unit 22 and the output value of the position detector 19.

Moreover, the controller 14 comprises a servo electricity supply unit 35 which supplies and cuts off electricity from a common power supply 36 to the servo motor 12 in response to a command from the command unit 22. Specifically, as illustrated in FIG. 1, the servo electricity supply unit 35 in the present embodiment supplies or stops electricity from the common power supply 36 to the servo amplifier 20, thereby supplying or stopping the electricity to the servo motor 12. Moreover, the common power supply 36, which supplies electricity for operating each component of the controller 14, is a permanent power supply, for example. Note that electrical connection lines between the individual components other than the servo electricity supply unit 35 and the common power supply 36 are omitted in FIG. 1 to facilitate the understanding of the drawings.

Further, the servo electricity supply unit 35 may include an electromagnetic contactor (not illustrated) provided on the power supply line for supplying electricity from the common power supply 36 to the servo motor 12. It is preferable that the servo electricity supply unit 35 switches between open and close of the contact of the electromagnetic contactor in response to a signal from the command unit 22, thereby switching on and off the supply of electricity to the servo motor 12. Moreover, upon supplying of electricity from the servo amplifier 20 to the servo motor 12, a direct current voltage, for example, a bus voltage, from the servo electricity supply unit 35 is converted to an alternating current voltage having a predetermined frequency by an inverter circuit (not illustrated) in the servo amplifier 20 and the alternating current voltage is supplied to the servo motor 12.

Furthermore, the command unit 22 outputs a power cut-off signal to the servo electricity supply unit 35 when a power off signal, which will be described later, is received, and outputs a brake signal to the brake control unit 21. The servo electricity supply unit 35 opens the contact of the electromagnetic contactor (not illustrated) when the power cut-off signal is received from the command unit 22, and stops the supply of electricity to the servo motor 12. On the other hand, the brake control unit 21 actuates the mechanical brake 13 by the brake signal. Moreover, the servo electricity supply unit 35 closes the contact of the electromagnetic contactor (not illustrated) when an electricity supply resume signal, which will be described later, is received from the command unit 22, and resumes the supply of electricity to the servo motor 12.

Note that, in the present embodiment, the main spindle head 17 of the machine tool 11 moves up and down in the direction of gravity along the ball screw 18. Accordingly, by actuating the mechanical brake 13 when the supply of electricity to the servo motor 12 which rotary drives the ball screw 18 is stopped, the fall of the main spindle head 17 due to the influence of gravity can be prevented.

An example of the mechanical brake 13 will be described. The mechanical brake 13 includes, for example, a friction braking member (not illustrated) driven by a solenoid (not illustrated), and an elastic member (not illustrated) which biases the friction braking member against the output axis of the servo motor 12 or a member coupled thereto. Further, by supplying electricity to the solenoid, the friction braking member separates from the output axis of the servo motor 12 against the biasing force of the elastic member. In other words, the mechanical brake 13 is released. On the other hand, by stopping the supply of electricity to the solenoid according to the brake signal described above, the friction braking member is pressed against the output axis of the servo motor 12 by the elastic member. In other words, the friction braking member secures the output axis of the servo motor 12. Note that, the mechanical brake 13 in the illustrated embodiment acts on the output axis of the servo motor 12 by way of example but the present invention is not limited thereto. Namely, the mechanical brake 13 may act on an axis driven by the servo motor 12, i.e., an axis driven in association with the rotation of the output axis of the motor.

Further, as illustrated in FIG. 1, the controller 14 further comprises a controller power supply source 23. The controller power supply source 23 is connected to the command unit 22. The controller power supply source 23 includes a power outage detection circuit 24 to which a power off signal is inputted when a power outage occurs, and a power off detection circuit 26 to which a power off signal is inputted when a power switch 25, which is provided on the outside of the controller 14, is switched from on to off. The power switch 25 is switched on while the machine tool 11 is in operation, and is switched off after the operation by the machine tool 11 has been finished or upon an emergency stoppage of the machine tool 11. Further, aside from the power switch 25, for example, an area sensor which can detect the intrusion of a person into the machine tool 11 may be provided to input the detection signal of the area sensor to the power off detection circuit 26 as a power off signal. Further, a signal which generates sound or light when notifying the outside of occurrence of failure in the machine tool, i.e., an alarm signal, may be inputted to the power off detection circuit 26 as a power off signal.

When the power switch 25 is off, i.e., while the power is off, the power off detection circuit 26 detects a power off signal and outputs a signal to the command unit 22. Further, during a power outage, the power outage detection circuit 24 detects the power off signal and outputs a signal to the command unit 22.

The command unit 22 outputs a power cut-off signal to the servo electricity supply unit 35 and outputs a brake signal to the brake control unit 21 in accordance with the power off signal from the power outage detection circuit 24 or the power off detection circuit 26 for the controller power supply source 23. Furthermore, when the command unit 22 which has outputted a brake signal receives an abnormality detection signal from an output unit 32 as described later, the command unit 22 outputs the aforementioned electricity supply resume signal to the servo electricity supply unit 35. In other words, when an abnormality determining unit 30 determines that abnormality exists in the mechanical brake 13, the command unit 22 provides the servo electricity supply unit 35 with a command to resume the supply of electricity to the servo motor 12. Note that the command unit 22 may output a signal detecting abnormality with the operating program of the machine tool 11 as the aforementioned brake signal to the brake control unit 21.

When the servo electricity supply unit 35 receives a power cut-off signal from the command unit 22, the supply of electricity to the servo motor 12 of the machine tool 11 is stopped, resulting in the servo motor 12 being in a non-excitation state. On the other hand, if the brake control unit 21 receives a brake signal from the command unit 22, the mechanical brake 13 of the machine tool 11 is actuated. Accordingly, the main spindle head 17 is braked. Specifically, in the machine tool 11 which moves the main spindle head 17 up and down, the position of the main spindle head 17 can be maintained by the mechanical brake 13 while the power is off or during power outages.

Furthermore, in the present application, the brake control unit 21 determines whether or not abnormality exists in the mechanical brake 13.

An "abnormality in the mechanical brake" as used herein means a state in which the intended braking force may not be obtained for reasons such as: oil has adhered to the surface of the friction braking member of the mechanical brake 13, the surface of the friction braking member has changed such that the friction force is reduced, the elastic member which biases the friction braking member has been damaged or the friction braking member has become remarkably worn.

More specifically, the brake control unit 21, as illustrated in FIG. 1, has a brake signal receiving unit 27, a position monitoring unit 28, a displacement amount calculation unit 29, the abnormality determining unit 30, the output unit 32, a first storage unit 31, and a second storage unit 33. The operation of the motor control system of the first embodiment when detecting abnormality of the mechanical brake 13 using these units will be described below.

Figure 2:
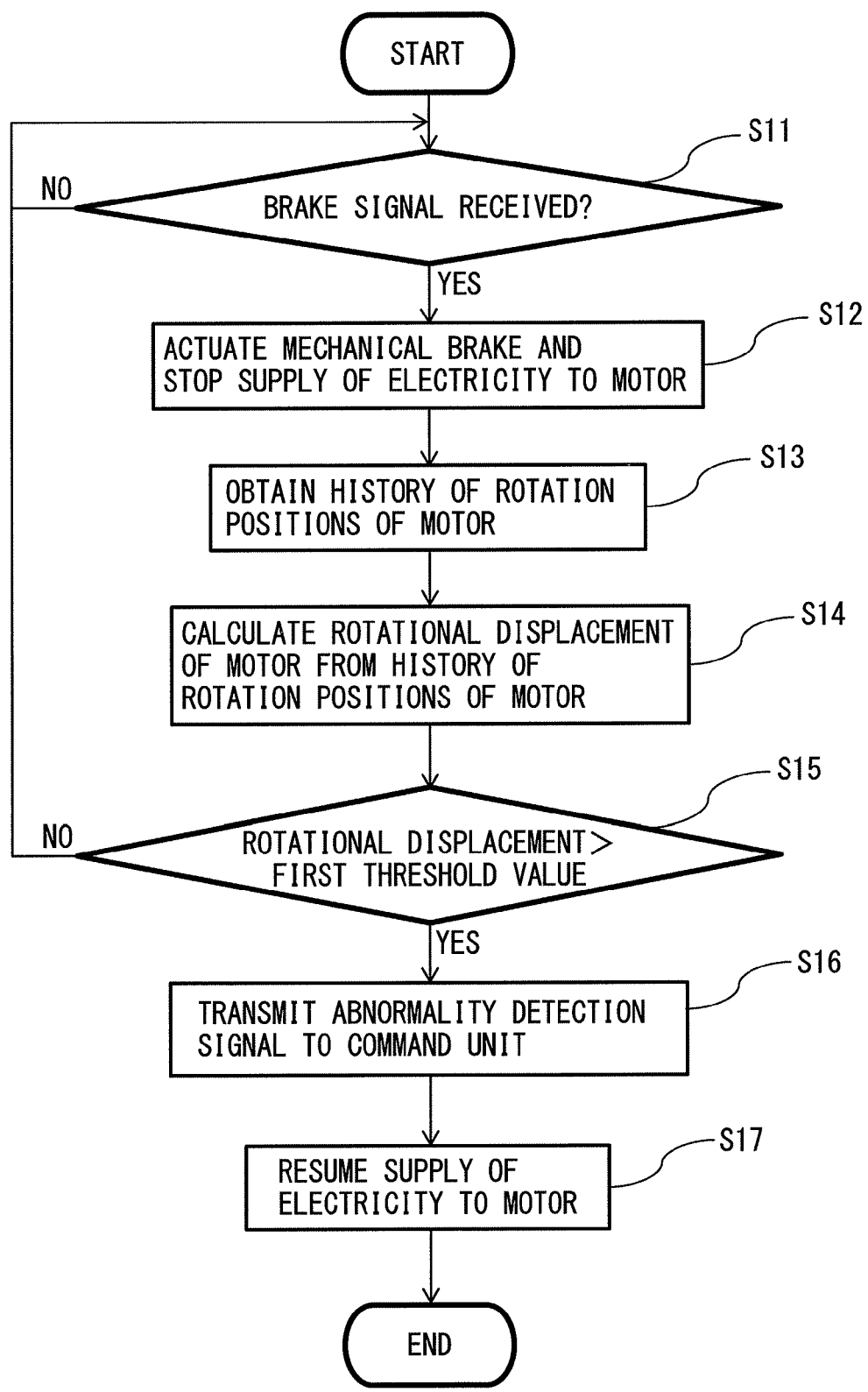
FIG. 2 is a flowchart illustrating the operation of the motor control system of the first embodiment when detecting abnormality of the mechanical brake.

FIG. 2 is a flowchart illustrating the operation of the motor control system of the first embodiment when detecting abnormality of the mechanical brake 13.

Referring to FIG. 2 together with FIG. 1, first, the brake signal receiving unit 27 of the brake control unit 21 receives a brake signal from the command unit 22 (FIG. 2, step S11). Along with the reception, the brake signal receiving unit 27 actuates the mechanical brake 13 and the servo electricity supply unit 35 stops the supply of electricity to the servo motor 12 (FIG. 2, step S12). For example, the brake signal receiving unit 27 outputs a brake signal to a brake circuit (not illustrated) of the mechanical brake 13. In response to the input of the brake signal, the brake circuit stops the supply of electricity to the solenoid of the mechanical brake 13. This causes the elastic member to press the friction braking member of the mechanical brake 13 against the output axis of the servo motor 12. Namely, the mechanical brake 13 is actuated. At this time, since a power cut-off signal is sent from the command unit 22 to the servo electricity supply unit 35, the servo electricity supply unit 35 stops the supply of electricity to the servo motor 12. In other words, the excitation of the servo motor 12 is released.

Further, the brake signal receiving unit 27 outputs the brake signal from the command unit 22 to the position monitoring unit 28, at the same time as the actuation of the mechanical brake 13.

Thereafter, the position monitoring unit 28 of the brake control unit 21 monitors the position (rotation position) of the output axis of the servo motor 12 by the position detector 19, for example, an encoder. Specifically, the position monitoring unit 28 starts the detection of the rotation position of the servo motor 12 with the aforementioned brake signal as a trigger signal, and obtains a history of the rotation positions of the servo motor 12 from the start of detection to when the rotation of the servo motor 12 stops (FIG. 2, step S13).

Thereafter, the displacement amount calculation unit 29 of the brake control unit 21, from the history of the rotation positions of the servo motor 12 obtained by the position monitoring unit 28, calculates the rotational displacement amount of the servo motor 12 (FIG. 2, step S14). The rotational displacement amount calculated in step S14 is the amount the position of the output axis of the servo motor 12 has changed in the rotation direction, from the start of braking the output axis of the servo motor 12 to when the rotation of the servo motor 12 has stopped. The calculated rotational displacement amount corresponds to a fallen amount of the main spindle head 17 after applying the mechanical brake 13. Accordingly, it is estimated that the larger the rotational displacement amount calculated by the displacement amount calculation unit 29, the lower the braking force of the mechanical brake 13. Accordingly, the abnormality determining unit 30 of the brake control unit 21 determines that when the rotational displacement amount calculated by the displacement amount calculation unit 29 exceeds a predetermined first threshold value, abnormality exists in the mechanical brake 13 (FIG. 2, step S15). The predetermined first threshold value can be changed and is stored beforehand in the first storage unit 31.

Further, the output unit 32 of the brake control unit 21 transmits an abnormality detection signal indicating that abnormality exists in the mechanical brake 13 to the command unit 22 (FIG. 2, step S16). Note that although an abnormality detection signal in the configuration illustrated in FIG. 1 is transmitted from the output unit 32 through the second storage unit 33 to the command unit 22, the present embodiments is not limited to the configuration. Namely, an abnormality detection signal may be transmitted from the output unit 32 directly to the command unit 22. Moreover, it is preferable that the output unit 32 outputs to the outside of the controller 14 that abnormality exists in the mechanical brake 13. As a method for output, displaying on a screen, printing, a light or sound alarm can be considered.

Thereafter, when the command unit 22 receives an abnormality detection signal from the output unit 32, the command unit 22 outputs an electricity supply resume signal to the servo electricity supply unit 35. Accordingly, the servo electricity supply unit 35 closes the contact of the electromagnetic contactor (not illustrated) to resume the supply of electricity to the servo motor 12 (FIG. 2, step S17).

Namely, it can be considered that any abnormality detected in the mechanical brake 13 is indicative of a significant reduction in the force for stopping the output axis of the servo motor 12. Thus, in the present application, the supply of electricity to the servo motor 12 is resumed to re-excite the servo motor 12 after the detection of abnormality of the mechanical brake 13, thereby being capable of securing a rotor and a rotary axis portion of the servo motor 12. Namely, this excitation of the servo motor 12 can compensate for the shortage of the braking force for the output axis of the servo motor 12 immediately after the detection of abnormality of the mechanical brake 13. Moreover, this promptly eliminates the risk of falling of the main spindle head 17 after the detection of abnormality of the mechanical brake 13.

The principle for the aforementioned detection of abnormality of the mechanical brake 13 is described.

Figure 3:
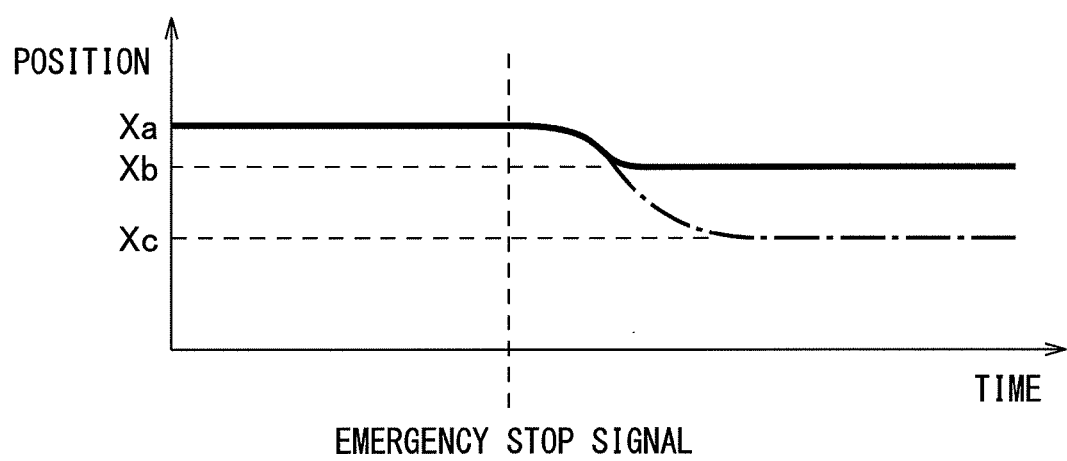
FIG. 3 is a graph illustrating the amount the main spindle head falls after the input of an emergency stop signal in the motor control system illustrated in FIG. 1.

FIG. 3 is a graph illustrating the amount the main spindle head 17 falls after the mechanical brake 13 has been actuated (for example, after the input of an emergency stop signal). In the graph, the horizontal axis represents time and the vertical axis represents the position of the main spindle head 17. Further, the solid line in the graph represents the change in position of the main spindle head 17 when the mechanical brake 13 is operating normally. Furthermore, the long and short dash line in the graph represents the change in position of the main spindle head 17 when abnormality exists in the mechanical brake 13.

For example, when the controller 14 of the machine tool 11 receives an emergency stop signal inputted thereto, the supply of electricity to the servo motor 12 is stopped, and the mechanical brake 13 is actuated and the main spindle head 17 is braked. When the mechanical brake 13 is operating normally, as illustrated with the solid line in FIG. 3, the position Xb of the main spindle head 17 when the servo motor 12 stops rotating in response to the emergency stop signal, has only slightly dropped from position Xa of the main spindle head 17 when the emergency stop signal was inputted. The reason a small drop occurs even during the normal operation of the mechanical brake 13 is that in a mechanical brake 13 using a friction braking system, due to assembly accuracy or backlash of a gear or the like, there is a period braking does not occur.

However, if abnormality of the mechanical brake 13 occurs, the period described above increases from when the braking by the mechanical brake 13 starts to when the rotation of the servo motor 12 stops. Therefore, when abnormality exists in the mechanical brake 13, as illustrated by the long and short dash line in FIG. 3, the position Xc of the main spindle head 17 when the servo motor 12 stops rotating in response to the emergency stop signal, corresponds to a position which has fallen more from the position Xa of the main spindle head 17 at the input of the emergency stop signal than the position Xb when the brake is operating normally.

From the above, the controller 14 of the present invention obtains the position displacement of the main spindle head 17 from when the emergency stop signal is inputted to when the rotation of the servo motor 12 stops as illustrated in FIG. 3, by the position monitoring unit 28 illustrated in FIG. 1. Further, the displacement amount calculation unit 29 and the abnormality determining unit 30 that are illustrated in FIG. 1 calculate the fallen amount (displacement amount) of the main spindle head 17 from when the emergency stop signal is inputted, and determine whether or not abnormality exists in the mechanical brake 13 based on the calculated displacement amount, respectively. Namely, according to the present invention, the degree to which the drop in effectiveness of the mechanical brake 13, when finishing a job with the machine tool 11 or at an emergency stoppage of the machine tool 11 can be understood. Accordingly, abnormality of the mechanical brake 13 or indications thereof can be detected, without separately carrying out an inspection of the mechanical brake 13.

In the aforementioned first embodiment, the first storage unit 31 illustrated in FIG. 1 may be provided with a function of sequentially storing the rotational displacement amount calculated by the displacement amount calculation unit 29, every time a brake signal is received, i.e., every time the mechanical brake 13 is actuated. In the case such a function is provided, the abnormality determining unit 30 can compare the rotational displacement amount calculated by the displacement amount calculation unit 29 and the rotational displacement amount previously stored in the first storage unit 31, every time a brake signal is received. Further, every time a brake signal is received, when the rotational displacement amount calculated by the displacement amount calculation unit 29 increases, it is preferable that the abnormality determining unit 30 determines this as a sign of the reduction in effectiveness of the mechanical brake 13.

Second Embodiment

Next, the second embodiment will be described. The same reference numerals are used for the same constitutional elements as the first embodiment and an explanation therefor will be omitted. Accordingly, the constitutional elements will only be described with respect to the differences from the first embodiment.

In the first embodiment described above, when the abnormality determining unit 30 determines that abnormality exists in the mechanical brake 13, the supply of electricity to the servo motor 12 is resumed to immobilize the rotary axis portion of the servo motor 12. Thus, the position of the main spindle head 17, where the rotary axis portion of the servo motor 12 is immobilized upon detection of abnormality in the mechanical brake 13, drops to a position which is further below the position in the normal operation of the brake. Namely, referring to FIG. 3, the main spindle head 17 stays still at the position Xc which has dropped further below the position Xb in the normal operation of the brake, from the position Xa of the main spindle head 17 at the time of input of the emergency stop signal. At this time, any interference on the workpiece W from the tool 16 attached to the main spindle head 17 apply a large load not only to the tool 16 and the workpiece W, but also to a rotating mechanism portion such as the ball screw 18 and the servo motor 12. Such a load continues unless the tool 16 is separated from the workpiece W. Further, the longer the load time is, the more damage is expected on the machine tool 11. It is thus desired that such a load be promptly removed.

To this end, according to the second embodiment, upon detection of abnormality in the mechanical brake 13, the rotation position of the servo motor 12 is shifted to the rotation position of the servo motor 12 at the time of reception of a brake signal. The reason is that a brake signal is outputted at a finish of a job with the machine tool 11 or at an emergency stoppage of the machine tool 11. Namely, it is because the rotation position of the servo motor 12 at the time of reception of such a brake signal usually corresponds to a position before causing the interference on the workpiece W from the tool 16.

Then, the motor control system of the second embodiment further comprises the second storage unit 33 as illustrated in FIG. 1 of the motor control system of the first embodiment described above. The second storage unit 33 stores and holds the rotation position of the servo motor 12 at the time of reception of the aforementioned brake signal by the brake signal receiving unit 27. Moreover, the command unit 22 provides the servo amplifier 20 with a position command value corresponding to the rotation position of the servo motor 12 at the time of reception of the brake signal.

The operation of the motor control system of the second embodiment when detecting abnormality of the mechanical brake 13 will be described below in detail.

Figure 4:
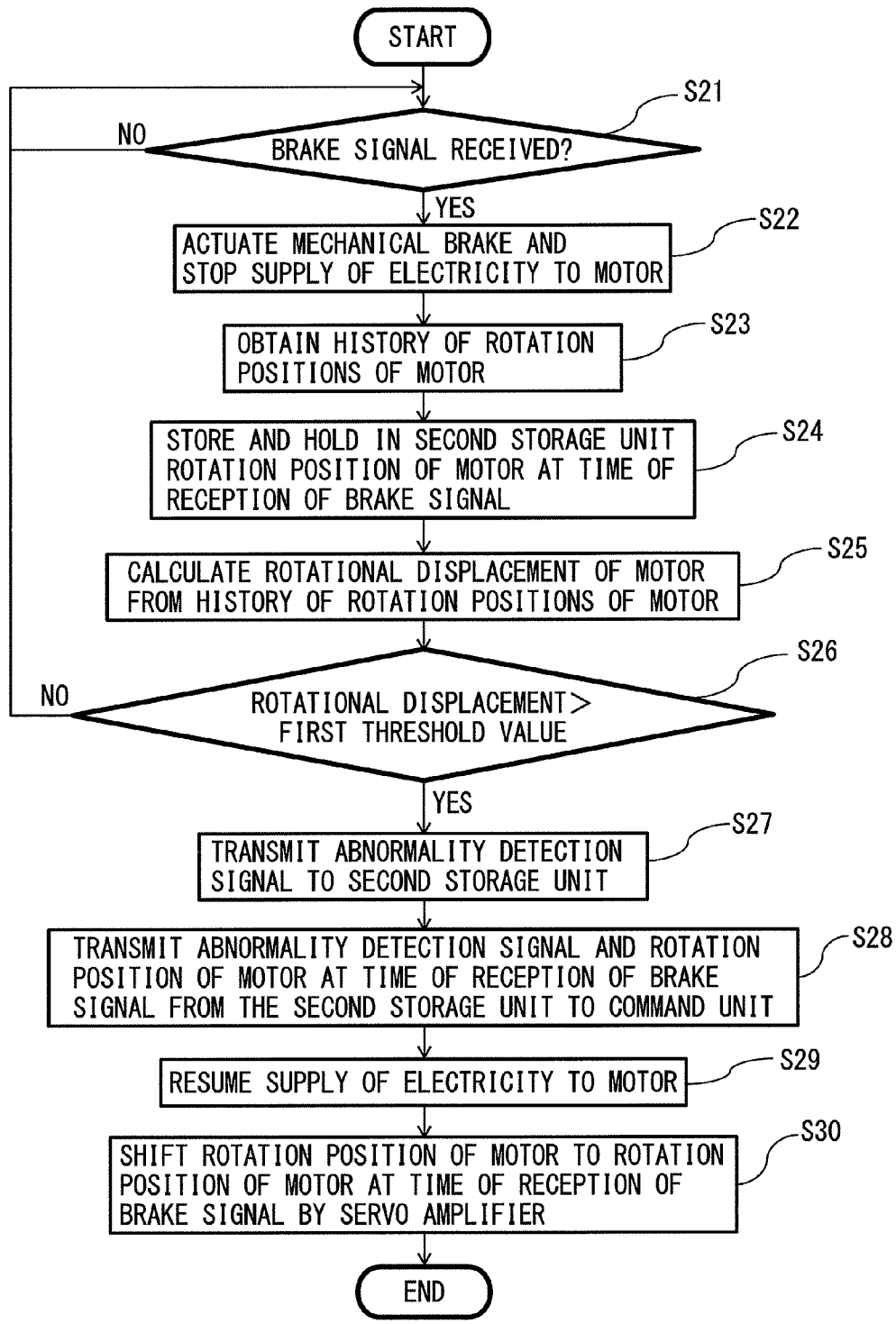
FIG. 4 is a flowchart illustrating the operation of the motor control system of a second embodiment when detecting abnormality of the mechanical brake.

FIG. 4 is a flowchart illustrating the operation of the motor control system of the second embodiment when detecting abnormality of the mechanical brake 13.

Referring to FIG. 4 together with FIG. 1, first, the brake signal receiving unit 27 of the brake control unit 21 receives a brake signal from the command unit 22 (FIG. 4, step S21). At this time, the command unit 22 sends a power cut-off signal to the servo electricity supply unit 35. Accordingly, the brake signal receiving unit 27 actuates the mechanical brake 13 and the servo electricity supply unit 35 stops the supply of electricity to the servo motor 12 (FIG. 4, step S22). Note that steps S21 and S22 respectively correspond to steps S11 and S12 described above with reference to FIG. 2.

Further, the brake signal receiving unit 27 outputs the brake signal from the command unit 22 to the position monitoring unit 28 at the same time as the actuation of the mechanical brake 13.

Thereafter, the position monitoring unit 28 of the brake control unit 21 monitors the position (rotation position) of the output axis of the servo motor 12 by the position detector 19, for example, an encoder. Specifically, the position monitoring unit 28 starts the detection of the rotation position of the servo motor 12 with the aforementioned brake signal as a trigger signal, and obtains a history of the rotation positions of the servo motor 12 from the start of detection to when the rotation of the servo motor 12 stops (FIG. 4, step S23). Step S23 corresponds to step S13 described above with reference to FIG. 2.

Moreover, when the brake signal receiving unit 27 receives the brake signal, the position monitoring unit 28 obtains the rotation position of the servo motor 12 using the position detector 19 and outputs data of the rotation position to the second storage unit 33. The second storage unit 33 thus stores and holds the rotation position of the servo motor 12 at the time of reception of the brake signal by the brake signal receiving unit 22 (FIG. 4, step S24).

Thereafter, the displacement amount calculation unit 29 of the brake control unit 21 calculates the rotational displacement amount of the servo motor 12, from the history of the rotation positions of the servo motor 12 obtained by the position monitoring unit 28 (FIG. 4, step S25). Step S25 corresponds to step S14 described above with reference to FIG. 2.

Then, the abnormality determining unit 30 of the brake control unit 21 determines that abnormality exists in the mechanical brake 13 when the rotational displacement amount calculated by the displacement amount calculation unit 29 exceeds a predetermined first threshold value (FIG. 4, step S26). Step S26 corresponds to step S15 described above with reference to FIG. 2. Note that the predetermined first threshold value can be changed and is stored beforehand in the first storage unit 31.

Further, the output unit 32 of the brake control unit 21 transmits an abnormality detection signal indicating that abnormality exists in the mechanical brake 13 to the second storage unit 33 (FIG. 4, step S27).

Upon reception of the abnormality detection signal, the second storage unit 33 transmits the abnormality detection signal and the rotation position of the servo motor 12 at the time of reception of the brake signal to the command unit 22 (FIG. 4, step S28).

Thereafter, upon reception of the abnormality detection signal from the second storage unit 33, the command unit 22 outputs an electricity supply resume signal to the servo electricity supply unit 35. Accordingly, the servo electricity supply unit 35 closes the contact of the electromagnetic contactor (not illustrated) to resume the supply of electricity to the servo motor 12 (FIG. 4, step S29). Step S29 corresponds to step S17 described above with reference to FIG. 2.

Moreover, the command unit 22 provides the servo amplifier 20 with the rotation position of the servo motor 12 at the time of reception of the brake signal as a position command value. Accordingly, the servo amplifier 20 shifts the rotation position of the servo motor 12 to the rotation position of the servo motor 12 at the time of reception of the brake signal (FIG. 4, step S30). Note that the excitation of the servo motor 12 is not released even after the shift.

According to the second embodiment described above, when a brake signal is received and abnormality is detected in the mechanical brake 13, the rotation position of the servo motor 12 is shifted to the rotation position of the servo motor 12 at the time of reception of the brake signal. This shift promptly eliminates any interference between the workpiece W and the tool 16 which is attached to the main spindle head 17, upon detection of abnormality of the mechanical brake 13.

Third Embodiment

Next, the third embodiment will be described. The same reference numerals are used for the same constitutional elements as the first and second embodiments and an explanation therefor will be omitted. Accordingly, the constitutional elements will only be described with respect to the differences from the first and second embodiments.

In the second embodiment described above, when a brake signal is received and abnormality is detected in the mechanical brake 13, the supply of electricity to the servo motor 12 is resumed and the rotation position of the servo motor 12 is shifted to the rotation position of the servo motor 12 at the time of reception of the brake signal. In the present invention, however, the position to which the rotation position of the servo motor 12 is shifted after the detection of abnormality in the mechanical brake 13 is not limited to the rotation position of the servo motor 12 at the time of reception of the brake signal. Namely, in the present invention, the rotation position of the servo motor 12 may be shifted to any position which lowers the risk due to falling of the main spindle head 17 after the detection of abnormality in the mechanical brake 13. The third embodiment is an example reflecting this point.

The operation of the motor control system of the third embodiment when detecting abnormality of the mechanical brake 13 will be described below in detail.

FIG. 5 is a flowchart illustrating the operation of the motor control system of the third embodiment when detecting abnormality of the mechanical brake 13.

Referring to FIG. 5 together with FIG. 1, first, the brake signal receiving unit 27 of the brake control unit 21 receives a brake signal from the command unit 22 (FIG. 5, step S31). At this time, the command unit 22 sends a power cut-off signal to the servo electricity supply unit 35. Accordingly, the brake signal receiving unit 27 actuates the mechanical brake 13 and the servo electricity supply unit 35 stops the supply of electricity to the servo motor 12 (FIG. 5, step S32). Note that steps S31 and S32 respectively correspond to steps S11 and S12 described above with reference to FIG. 2.

Further, the brake signal receiving unit 27 outputs the brake signal from the command unit 22 to the position monitoring unit 28 at the same time as the actuation of the mechanical brake 13.

Thereafter, the position monitoring unit 28 of the brake control unit 21 monitors the position (rotation position) of the output axis of the servo motor 12 by the position detector 19, for example, an encoder. Specifically, the position monitoring unit 28 starts the detection of the rotation position of the servo motor 12 with the aforementioned brake signal as a trigger signal, and obtains a history of the rotation positions of the servo motor 12 from the start of detection to when the rotation of the servo motor 12 stops (FIG. 5, step S33). Step S33 corresponds to step S13 described above with reference to FIG. 2.

Thereafter, the displacement amount calculation unit 29 of the brake control unit 21, from the history of the rotation positions of the servo motor 12 obtained by the position monitoring unit 28, calculates the rotational displacement amount of the servo motor 12 (FIG. 5, step S34). Step S34 corresponds to step S14 described above with reference to FIG. 2.

Then, the abnormality determining unit 30 of the brake control unit 21 determines that abnormality exists in the mechanical brake 13 when the rotational displacement amount calculated by the displacement amount calculation unit 29 exceeds a predetermined first threshold value (FIG. 5, step S35). Step S35 corresponds to step S15 described above with reference to FIG. 2. Note that the predetermined first threshold value can be changed and is stored beforehand in the first storage unit 31.

Further, the output unit 32 of the brake control unit 21 transmits an abnormality detection signal indicating that abnormality exists in the mechanical brake 13 to the second storage unit 33 (FIG. 5, step S36).

Upon reception of the abnormality detection signal, the second storage unit 33 transmits the abnormality detection signal and the rotation position of the servo motor 12 stored beforehand in the second storage unit 33 to the command unit 22 (FIG. 5, step S37). The rotation position of the servo motor 12 stored beforehand in the second storage unit 33 is preferably a position which causes no interference on the workpiece W from the tool 16 attached to the main spindle head 17. For example, the second storage unit 33 stores beforehand an arbitrary position except for a space above the workpiece W secured to the work table 15, as illustrated in FIG. 1. An example of such positions stored in the second storage unit 33 includes a tool change position of an automatic tool changer (not illustrated) arranged in the machine tool.

Namely, there is a form of the machine tool which includes a tool receiving unit (not illustrated), such as a turret or a magazine, for receiving a plurality of tools 16 attachable to the main spindle head 17, and an automatic tool changer (not illustrated) for changing the tool 16 attached to the main spindle head 17 with another one of the tools 16 received in the tool receiving unit. In such a form of the machine tool, upon changing the tools 16, the tool 16 attached to the main spindle head 17 is shifted to the tool change position preset in the automatic tool changer. The main spindle head 17 may be configured to shift, of course, in a horizontal direction as well as in a direction of gravity. Such a tool change position is a position which causes no interference on the workpiece W from the tool 16 attached to the main spindle head 17. Furthermore, removing the tool 16 attached to the main spindle head 17 by the automatic tool changer decreases the degree of risk due to falling of the main spindle head 17. Thus, it is preferable in the present embodiment that the second storage unit 33 stores beforehand the tool change position of the automatic tool changer and that the second storage unit 33 transmits the tool change position to the command unit 22 upon detection of any abnormality in the mechanical brake 13.

After step S37 described above, upon reception of the abnormality detection signal from the second storage unit 33, the command unit 22 outputs an electricity supply resume signal to the servo electricity supply unit 35. Accordingly, the servo electricity supply unit 35 closes the contact of the electromagnetic contactor (not illustrated) to resume the supply of electricity to the servo motor 12 (FIG. 5, step S38). Step S38 corresponds to step S17 described above with reference to FIG. 2.

Moreover, the command unit 22 issues to the servo amplifier 20 a command of the rotation position of the servo motor 12 stored beforehand in the second storage unit 33. Accordingly, the servo amplifier 20 shifts the rotation position of the servo motor 12 to the rotation position of the servo motor 12 commanded by the command unit 22 (FIG. 5, step S39). At this time, for example, the main spindle head 17 to which the tool 16 is attached is shifted to the tool change position of the automatic tool changer of the machine tool as described above.

Thereafter, when the rotation position of the servo motor 12 being detected by the position detector 19 becomes the rotation position of the servo motor 12 commanded at step S39, for example, the tool change position, the command unit 22 outputs to the servo electricity supply unit 35 a command for stopping the supply of electricity to the servo motor 12. Accordingly, the servo amplifier 20 stops the supply of electricity to the servo motor 12 (FIG. 5, step S40). Further, step S40 releases the excitation of the servo motor 12 for moving the main spindle head 17. This facilitates the inspection or repair of the mechanical brake 13.

Note that it is preferable in step S40 that the command unit 22 obtains the rotation position of the servo motor 12 detected by the position detector 19 via the position monitoring unit 28 of the brake control unit 21.

According to the third embodiment described above, the second storage unit 33 stores beforehand such a safe position that imposes no excessive load on the servo motor 12 and the axis driven thereby if any abnormality exists in the mechanical brake 13. In other words, the second storage unit 33 stores beforehand a position, for example, the tool change position of the automatic tool changer, which causes no interference between the workpiece W and the tool 16 attached to the main spindle head 17 if the main spindle head 17 falls due to abnormality in the mechanical brake 13. This enables the main spindle head 17 to be shifted to the tool change position of the automatic tool changer when a brake signal is received and abnormality is detected in the mechanical brake 13. Namely, it is possible to lower the degree of risk due to falling of the main spindle head 17 at the time of detection of abnormality in the mechanical brake 13.

Other Embodiments

Further, the motor control system of each of the aforementioned embodiments detects the position of the servo motor 12 in the rotational direction, by a pulse coder such as an encoder, to obtain the falling amount (rotational displacement amount) of the main spindle head 17 after the actuation of the mechanical brake 13. However, instead of using such an encoder, the falling amount (rotational displacement amount) of the main spindle head 17 after the actuation of the mechanical brake 13 may be directly obtained by using a linear scale.

Further, the motor control system of each of the aforementioned three embodiments may be applied not only to the machine tool 11 as illustrated in FIG. 1 but also to an industrial robot or a motor driven press machine, etc. For example, if applied in an industrial robot, the servo motor 12 is used to drive an axis of the robot and the position detector 19 is used to monitor the displacement amount of the axis of the robot.

Furthermore, the mechanical brake 13 is provided on the outside of the servo motor 12 as illustrated in FIG. 1. However the mechanical brake 13 may be built into the servo motor 12 such that they are integrated. Namely, the mechanical brake 13 is provided to brake the output axis of the servo motor 12 or a drive axis like the ball screw 18 connected to the output axis.

The above indicated embodiments are typical. However, the present invention is not limited to such embodiments, and the shape, configuration and materials may be changed within a range not deviating from the spirit of the present invention.

The Effects of the Aspects of the Invention

According to the first aspect of the present invention, the displacement of the rotation position of the servo motor from when the signal for actuating the mechanical brake is received to when the rotation of the servo motor stops is calculated. By determining whether the calculated rotational displacement amount exceeds the predetermined first threshold value, abnormality of the mechanical brake or an indication thereof may be detected. Namely, according to the present invention, the degree to which the reduction in effectiveness of the mechanical brake can be understood, for example, when a machine tool or a robot etc. finishes a job or during an emergency stop. Therefore, abnormality of the mechanical brake or an indication thereof can be detected without separately carrying out an inspection of the mechanical brake. In other words, a motor control system which realizes a high level of preventative maintenance by the early detection of abnormalities of the mechanical brake or an indication thereof which would lead to the breakdown of the machine tool or the robot can be provided.

Further, according to the first aspect of the present invention, the supply of electricity to the servo motor is resumed after the detection of abnormality of the mechanical brake, thereby being capable of securing a rotor and a rotary axis portion of the servo motor by the excitation of the servo motor. Namely, this excitation of the servo motor can compensate for the shortage of the braking force for the output axis of the servo motor immediately after the detection of abnormality of the mechanical brake. Moreover, this promptly eliminates the risk of falling of the main spindle head after the detection of abnormality of the mechanical brake.

Further, according to the second aspect of the present invention, after the detection of abnormality of the mechanical brake, the rotation position of the servo motor can be shifted to the position at the time of reception of the brake signal. This shift promptly eliminates any interference between the workpiece and the tool attached to the main spindle head upon detection of abnormality of the mechanical brake.

According to the third aspect of the present invention, the storage unit can store beforehand such a safe position that imposes no excessive load on the servo motor and the axis driven thereby if any abnormality exists in the mechanical brake. Thus, after the detection of abnormality of the mechanical brake, the rotation position of the servo motor can be shifted to a safe position stored beforehand in the storage unit.

According to the fourth aspect of the present invention, after the shift of the rotation position of the servo motor to a safe position stored beforehand in the storage unit, the excitation of the servo motor is released. This facilitates the inspection or repair of the mechanical brake.

The invention claimed is:

1. A motor control system comprising:
   a servo motor;
   a mechanical brake which is configured to act on the servo motor or an axis driven by the servo motor;
   a servo electricity supply unit which supplies electricity to the servo motor;
   a controller which controls the servo motor, the mechanical brake, and the servo electricity supply unit; and
   a position detector which detects a rotation position of the servo motor or a position of the axis,
   wherein
   the controller comprises:
   a signal receiving unit which receives a signal for actuating the mechanical brake;
   a position monitoring unit which monitors the rotation position of the servo motor by the position detector, and obtains a history of the rotation positions of the servo motor from when the signal is received by the signal receiving unit to when the servo motor stops rotating;
   a displacement amount calculation unit which calculates, from the history, a rotational displacement amount of the servo motor from when the signal is received by the signal receiving unit to when the servo motor stops rotating; and
   an abnormality determining unit which determines that abnormality exists in the mechanical brake when the calculated rotational displacement amount exceeds a predetermined first threshold value, and
   when the signal receiving unit receives the signal, the controller controls the servo electricity supply unit to stop the supply of electricity to the servo motor, and
   when the abnormality determining unit determines that abnormality exists in the mechanical brake, the controller controls the servo electricity supply unit to resume the supply of electricity to the servo motor.

2. The motor control system according to claim 1, wherein the controller further comprises a storage unit which, when the signal receiving unit receives the signal, stores and holds a rotation position of the servo motor when the signal is received, and
   when the abnormality determining unit determines that abnormality exists in the mechanical brake after the signal receiving unit receives the signal, the controller controls the servo electricity supply unit to resume the supply of electricity to the servo motor and shift the rotation position of the servo motor to the rotation position of the servo motor stored and held in the storage unit.

3. The motor control system according to claim 1, wherein the controller further comprises a storage unit which stores beforehand a predetermined position relating to the rotation position of the servo motor, and
   when the abnormality determining unit determines that abnormality exists in the mechanical brake after the signal receiving unit receives the signal, the controller controls the servo electricity supply unit to resume the supply of electricity to the servo motor and shift the rotation position of the servo motor to the predetermined position stored beforehand in the storage unit.

4. The motor control system according to claim 3, wherein, after the rotation position of the servo motor is shifted to the predetermined position stored beforehand in the storage unit, the controller controls the servo electricity supply unit to stop the supply of electricity to the servo motor.

* * * * *